(12) United States Patent
Guichard et al.

(10) Patent No.: US 8,454,786 B2
(45) Date of Patent: Jun. 4, 2013

(54) METHOD FOR PRODUCING DRIP IRRIGATION PIPES

(75) Inventors: Jean-Pierre Guichard, Orzen (CH); Jean-Luc Vagnières, Baulmes (CH); Eberhard Kertscher, Yvonand (CH)

(73) Assignee: The Machines Yvonand SA, Yvonand (CH)

( * ) Notice: Subject to any disclaimer, the term of this patent is extended or adjusted under 35 U.S.C. 154(b) by 54 days.

(21) Appl. No.: 12/991,114

(22) PCT Filed: May 5, 2009

(86) PCT No.: PCT/EP2009/055420
§ 371 (c)(1),
(2), (4) Date: Nov. 4, 2010

(87) PCT Pub. No.: WO2009/135844
PCT Pub. Date: Nov. 12, 2009

(65) Prior Publication Data
US 2011/0056619 A1    Mar. 10, 2011

(30) Foreign Application Priority Data
May 5, 2008   (EP) .................................... 08155623

(51) Int. Cl.
*B29C 47/00*   (2006.01)
*B05B 15/00*   (2006.01)

(52) U.S. Cl.
USPC ...................................... 156/244.13; 239/542

(58) Field of Classification Search
USPC ........ 156/244.13; 239/542, 726–742; 405/43, 405/44; 264/259, 540–543
See application file for complete search history.

(56) References Cited

U.S. PATENT DOCUMENTS

| | | | | |
|---|---|---|---|---|
| 3,129,461 A | * | 4/1964 | Zavasnik et al. | 264/178 R |
| 4,307,841 A | * | 12/1981 | Mehoudar et al. | 239/542 |
| 4,859,264 A | * | 8/1989 | Buluschek | 156/244.13 |
| 5,271,786 A | * | 12/1993 | Gorney et al. | 156/229 |
| 6,896,758 B1 | * | 5/2005 | Giuffre' | 156/244.13 |

FOREIGN PATENT DOCUMENTS

| WO | WO 99/62691 A1 | 12/1999 |
|---|---|---|
| WO | WO 9962691 A1 * | 12/1999 |

* cited by examiner

*Primary Examiner* — Katarzyna Wyrozebski Lee
*Assistant Examiner* — Carson Gross
(74) *Attorney, Agent, or Firm* — Dorsey & Whitney LLP

(57) ABSTRACT

In a method for producing drip irrigation pipes, a tube body is extruded from a thermoplastic synthetic material and provided with a wall. The tube body is led directly and in non-contact fashion to a pre-cooling chamber in which the tube body is pre-cooled and in which metering elements are pressed on to the wall and connected to the wall. The tube body is sized to a final diameter and further cooled in a cooling chamber.

14 Claims, 4 Drawing Sheets

METHOD FOR PRODUCING DRIP IRRIGATION PIPES

Figure 1:
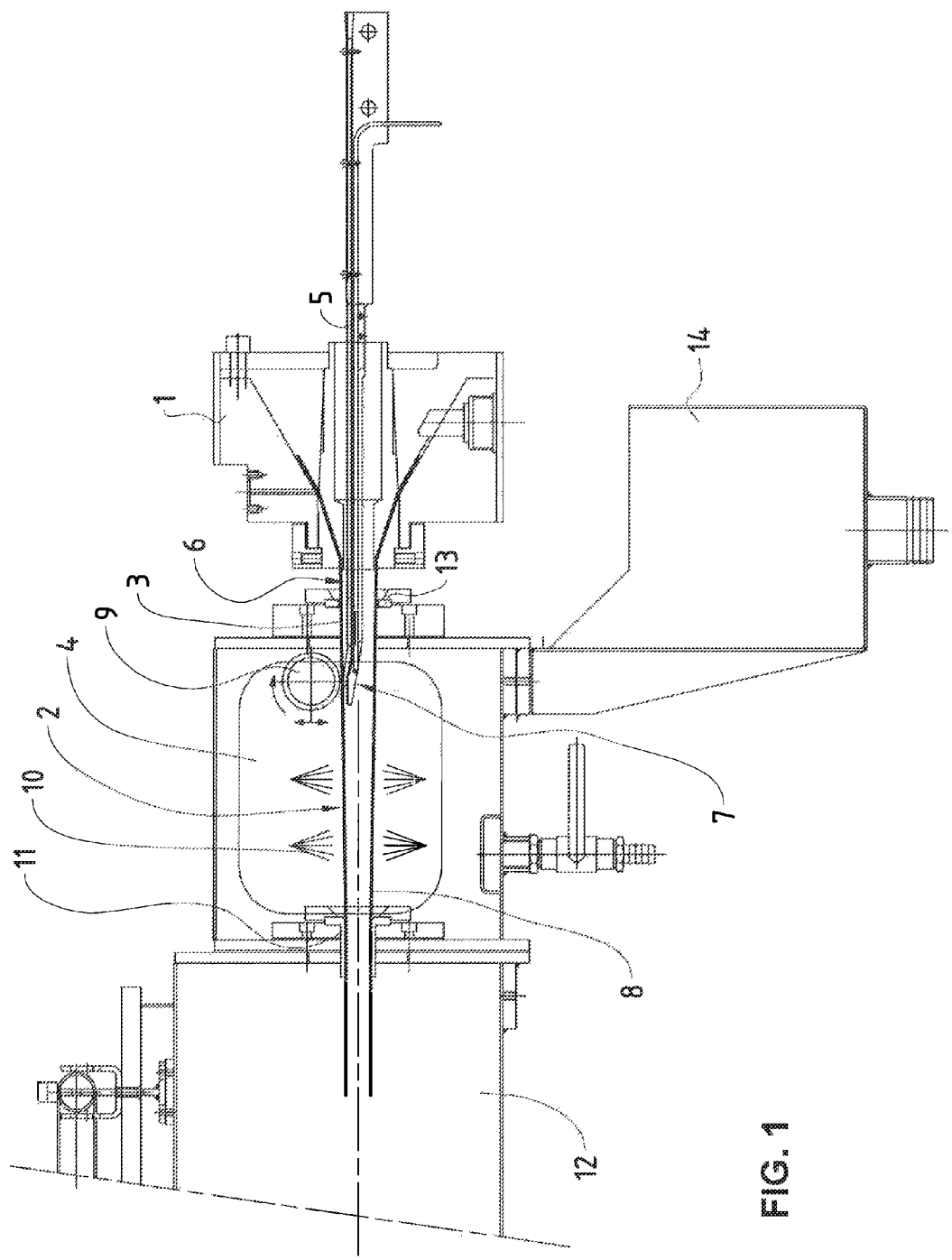

This invention relates to the production of drip irrigation tubes.

Drip irrigation tubes of this kind are used in particular for direct irrigation of plants. For this purpose, in these irrigation tubes, one or more metering elements can be disposed in the region of the plants by means of which it is made possible for the water to be able to escape dropwise through a bore made in the walling of the tube. With drip irrigation tubes of this kind, water can be used very sparingly and efficiently.

The manufacture of such tubes takes place in a known way, such as is shown for instance in EP-A 0970602, by a tube body being extruded by an extrusion device. This extruded tube body is formed to the desired diameter and cooled. Pushed into the tube body are metering elements which are pressed onto the walling of the tube, and are welded together therewith. The tube body provided with these metering elements is guided through a drilling device, in which a continuous bore is made in the walling, through which bore the water, metered by the metering element, is able to escape dropwise. Afterwards the tube body can be wound up, for example on a winding device.

The essential step in production methods of this kind for drip irrigation tubes is the putting in and welding of the metering elements with the walling of the tube body at high speed of production. With the previously described method there is the risk that the friction resistance of the tube body in the sizing device leads to a stretching of the not yet cooled off plastic and thus to an orientation of the chains of molecules. This can have the consequence that the thus produced tube does not achieve the desired elasticity. Furthermore there is the risk that the tube body cools off too much by the time the metering elements are brought into contact with the walling of the tube body and are welded together therewith. This can have the result that the place of connection between metering body and walling of the tube body is not optimal, and can lead to leakage, which can affect the quality of the drip irrigation tube.

The object of the present invention thus consists in creating a method for production of drip irrigation tubes in which the aforementioned drawbacks are avoided and with which an optimal connection of the metering elements to the walling of the tube body can be achieved, in a way largely independent of the thickness of the walling of the drip irrigation tubes to be produced.

This object is achieved according to the invention in that the extruded tube body exiting the extrusion device is led directly and in non-contacting way through an inlet aperture into a pre-cooling chamber in which the tube body is pre-cooled and in which the metering elements are connected to the walling and are completely pressed thereon, in that the tube body is led through a sizing device, and is formed to the final diameter, and arrives in the main cooling chamber in which the tube body is further cooled.

With this method according to the invention an optimal connection is obtained between metering elements and walling of the tube body, since the place where the connection is made is located close to the place where the extruded tube leaves the extrusion nozzle. The material has not yet cooled off that much, and still has a relatively high degree of softness, which improves the quality of the connection between the metering elements and the walling of this tube body. Since the forming to size of the tube body does not take place until after the metering element is completely connected to the walling of the tube body and the tube body has correspondingly cooled off by means of the pre-cooling and has a certain stability, the chains of molecules are aligned only to a limited extent; the elasticity of the finished drip irrigation tube is ensured to the desired degree.

Preferably the metering elements are inserted into the tube body via a guideway and the metering elements are pressed onto the walling by the end region of the guideway and a roller supporting the exterior of the walling, whereby a slight resistance arises.

Another advantageous embodiment of the invention consists in that the depth of penetration of the metering elements in the walling of the tube body is determined by adjustment of the spacing apart between the end region of the guideway and the supporting roller. Through this adjustment of the spacing apart the depth of penetration of the metering elements in the walling of the tube body can be defined; the risk that the metering elements are pressed too forcefully on the walling of the tube body and thus can damage the walling, as can occur with adjustment of the pressing pressure, is thereby avoided.

Preferably the depth of penetration of the metering elements in the walling of the tube body is defined at 2% to 50% of the thickness of the walling, whereby different wall thicknesses of tube bodies can be taken into account.

In the pre-cooling chamber the coolant is sprayed on the tube body. The coolant in the pre-cooling chamber may also form a bath, however, which is passed through by the tube body, whereby the optimal solution may be chosen for the respective instance.

Since no contact occurs in this area between the wall of the pre-cooling chamber, in which the inlet aperture is provided, and the tube body, and just a lip seal can be installed, coolant may escape out of the inlet aperture of the pre-cooling chamber, which coolant can preferably be collected by means of a catch basin.

Preferably the roller supporting the exterior of the walling is driven, whereby the resistance against the progressing tube body is kept as minimal as possible.

Preferably, ambient pressure predominates in the pre-cooling chamber, which simplifies its construction, while a low pressure is created in the main cooling chamber, by means of which it is achieved that the tube body does not collapse.

The method according to the invention will be explained more closely in the following with reference to the attached drawing.

Figure 2:
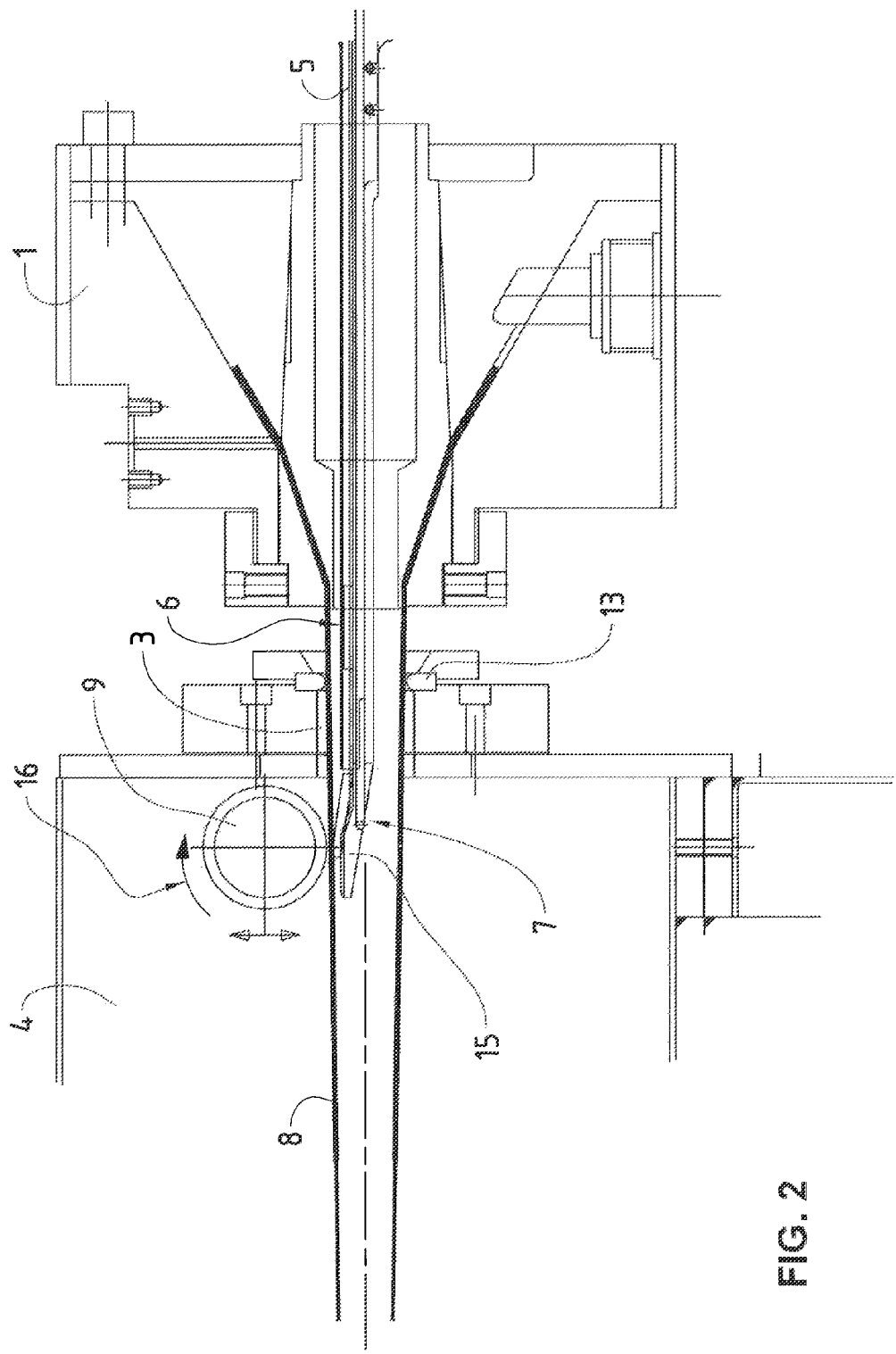
Figure 3:
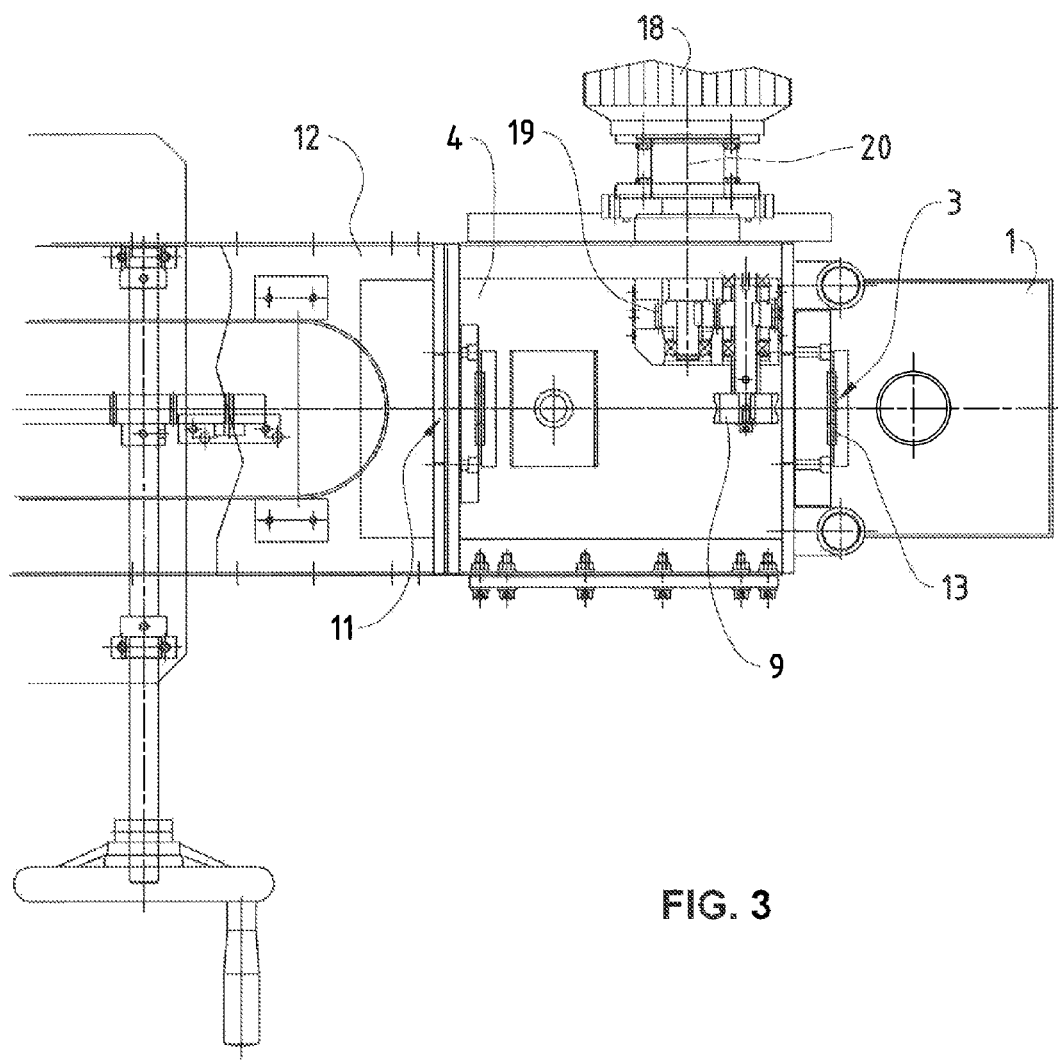
Figure 4:
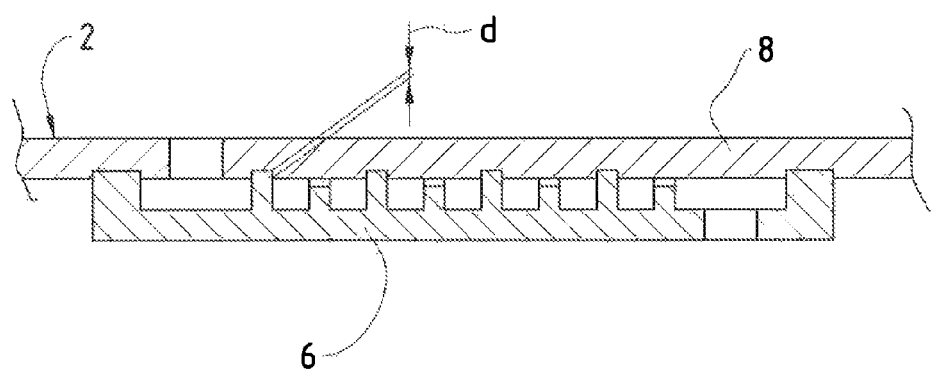

FIG. 1, in a diagrammatic sectional representation, the extrusion area, the insertion of the metering elements, the pre-cooling chamber and the main cooling chamber of a facility for production of drip irrigation tubes;

FIG. 2, in a diagrammatic, enlarged sectional representation, the extrusion device, the feed device for the metering elements and the pre-cooling chamber of the facility according to FIG. 1;

FIG. 3, in a diagrammatic sectional representation, a view from above of the pre-cooling chamber with driven roller disposed therein;

FIG. 4, a simplified, enlarged sectional representation of a metering element connected to the walling of the tube body.

Seen from FIG. 1 is a portion of the production facility with which the drip irrigation tubes can be produced according to the inventive method. Shown thereby is the extrusion device 1, with which the tube body 2 is continuously extruded in a known way. The extruded material is a thermoplastic synthetic material, for example polyethylene. This tube body 2 arrives in a pre-cooling chamber 4 via an inlet aperture 3.

Inserted in a known way into the tube body 2 are metering elements 6 via a guideway 5. The metering elements 6 can hereby be moved forward in a known way, for instance via a mechanical pusher, onto the guideway 5. Other feed systems are also known with which metering elements 6 can be moved forward, for example via air jets.

The end region 7 of the guideway 5 is designed such that in this area the metering elements 6 come into contact with the interior of the walling 8 of the tube body 2, are carried along with the progressing tube body 2, and are pressed into the still soft walling 8 and welded together therewith by means of the end region 7 and an externally situated roller 9, disposed in the pre-cooling chamber 4 and supporting the exterior of the walling 8 of the tube body 2.

In the pre-cooling chamber 4, the tube body 2 is pre-cooled, which can take place, for example, through the spraying of the tube body 2 with a coolant 10, as is shown schematically in FIG. 1. The pre-cooling can also be carried out in that the pre-cooling chamber 4 is filled with a coolant and the tube body 2 passes through the thus formed cooling bath.

From the pre-cooling chamber 4, the tube body 2 arrives in a main cooling chamber 12 by way of a sizing device 11. By means of the sizing device 11 the tube body is formed in a known way to its final diameter. In the subsequent main cooling chamber 12 the tube body is cooled further. Preferably a low pressure prevails in this main cooling chamber 12, whereby the tube body 2 is prevented from collapsing. Also achieved by means of this low pressure is that the seal between sizing device 11 and tube body 2 passing through is complete.

The thus cooled-off and solidified tube body is then led into a pulling device (not shown), with which the tube body is advanced. It then reaches in a known way a drilling device in which the walling of the tube body is provided with a continuous bore in the right place in the region of the metering element. The thus finished drip irrigation tube can then be wound up, for example on a winding device.

As can be seen in particular in the enlarged representation according to FIG. 2, the freshly extruded tube body 2 arrives in the pre-cooling chamber 4 via the inlet aperture 3. The inlet aperture 3 hereby has over its entire length a diameter which is larger than the diameter of the extruded tube body 2, so that the tube body 2 does not come into contact with the inlet aperture 3. Provided in the inlet aperture 3 is a lip seal 13, which exerts practically no pressing pressure on the extruded tube body 2 and with which the pre-cooling chamber 4 is sealed off. However, the seal is such that coolant can nevertheless escape through this inlet aperture 3. This coolant is captured by a catch basin 14, which is disposed beneath the inlet aperture 3. The thus collected coolant can be guided back again into the coolant circuit of the facility.

As has been already mentioned, the end region 7 of the guideway 5 is designed such that the fed metering element 6 comes into contact with the walling 8 of the extruded tube body 2. The end region 7 of the guideway 5 has a further region 15, which is aligned substantially parallel to the walling 8 of the tube body 2, and by means of which the metering element 6 is pressed against the walling 8 of the tube body 2. The roller 9 is disposed outside the walling 8 of the tube body 2 opposite this further region 15 of the guideway 5. Thus, via this further region 15 of the guideway 5 and the roller 9, the respective metering element 6 is pressed onto the interior of the walling 8 and is connected or welded together therewith.

The roller 9 is drivable, as is indicated by the arrow 16, whereby the resistance to the pressing of the respective metering elements 6 on the walling 8 of the tube body 2 can be kept as slight as possible. Of course the circumferential speed of the roller 9 corresponds to the rate of feed of the extruded tube body 2. The spacing between the roller 9 and the further region 15 of the guideway 5 is adjustable, which can be carried out in a known way, for example, through raising and lowering of the roller 9, indicated by the double arrow. Of course it would also be conceivable to design the end region 7 of the guideway 5 to be adjustable. It would also be possible to design both the roller 9 and the end region 7 of the guideway 5 to be adjustable, whereby an adaptation to differing diameters of the tube body would be made possible, when, for example, the exit nozzle of the extrusion device has been changed.

The connection to the interior of the walling 8 and pressing together of the metering elements 6 therewith thus takes place exclusively between the further region 15 and the roller 9, whereby an optimal connection is ensured since the tube body in this area is still relatively soft and has a correspondingly high temperature. Because of the softness of the tube body 2 in this area, one also refrains, for example, from pressing the roller 9 with a predetermined pressing pressure on the tube body 2, since the depth of penetration of the metering element 6 into the tube body 2 thereby could not be controlled.

In the view from above according to FIG. 3, the catch basin 14, the inlet aperture 3, the pre-cooling chamber 4, the sizing device 11 and the main cooling chamber 12 can be seen. The roller 9 is disposed inside the pre-cooling chamber 4. The driving takes place in a known way via an electromotor 18 and a gearing 19. The moving of the roller 9 for adjustment of the spacing apart from the further region 15 (FIG. 2) of the guideway can take place, for example, in that the gearing 19 is pivoted in a known way about the drive axis 20 of the electromotor 18.

Shown in FIG. 4 in a simplified way and enlarged is the connection of a metering element 6 to the walling 8 of the tube body 2. Through the adjustment of the spacing between the end region 7 of the guideway 5 and the roller 9, as has been described with reference to FIG. 2, the depth of penetration d of the metering element 6 in the walling 8 of the tube body 2 can be adapted. Thereby obtained during the production process is a quality of connection between metering elements 6 and tube body 2 that remains the same over the entire length of a drip irrigation tube. Depending upon thickness of the walling 2 and inserted metering element, this depth of penetration d can be defined at about 2% to 50% of the thickness of the walling 8 of the tube body 2.

With this method according to the invention for production of drip irrigation tubes, an optimal quality of connection is obtained between metering elements and extruded tube body, regardless of which type of metering elements is used and how thick the walling is of the tube body. A constant optimal quality of the connections between metering elements and tube body is ensured.

The invention claimed is:

1. Method for production of drip irrigation tubes, in which a tube body is produced through a step of extrusion of a thermoplastic synthetic material, which tube body is formed to size and cooled off and in which tube body metering elements with a spacing apart from one another are inserted, are pressed onto the walling of the tube body and are welded together therewith, and which tube body is led through a drilling device, in which the walling is drilled through in the area of each of the metering elements, characterized in that the extruded tube body exiting the extrusion device is led directly and in a non-contacting way through an inlet aperture into a pre-cooling chamber in which the tube body is pre-cooled and in which the metering elements are connected to the walling and are completely pressed thereon, in that the tube body is subsequently led through a sizing device and is formed to the final diameter and arrives in the main cooling chamber in which the tube body is further cooled.

2. Method according to claim 1, wherein the metering elements are inserted into the tube body via a guideway and wherein the metering elements are pressed onto the walling by the end region of the guideway and a roller supporting the exterior of the walling.

3. Method according to claim 2, wherein the depth of penetration of the metering elements in the walling of the tube body is defined by adjustment of the spacing apart between the end region of the guideway and the supporting roller.

4. Method according to claim 3, wherein the depth of penetration of the metering elements in the walling of the tube body is defined at 2% to 50% of the thickness of the walling.

5. Method according to claim 2, wherein the roller supporting the exterior of the walling is driven.

6. Method according to claim 1, wherein in the pre-cooling chamber the coolant is sprayed on the tube body.

7. Method according to claim 6, wherein the coolant emerging through the inlet aperture of the pre-cooling chamber is collected by a catch basin.

8. Method according to claim 1, wherein in the pre-cooling chamber the coolant forms a bath, which is passed through by the tube body.

9. Method according to claim 1, wherein ambient pressure predominates in the pre-cooling chamber and a low pressure is created in the main cooling chamber.

10. A method for producing drip irrigation tubes, comprising producing a tube body having a walling from a thermoplastic synthetic material in an extrusion device, leading the tube body directly and in a non-contacting way from the extrusion device into an opening of a first chamber for pre-cooling the tube body, pressing metering elements on to the walling of the tubing in spaced-apart positions and connecting the metering elements to the walling while the tube body is in the first chamber downstream of the opening, sizing the tube body to a final diameter and further cooling the tube body in a second chamber.

11. The method of claim 10, wherein the sizing step includes sizing the tube body in a sizing device.

12. The method of claim 10, further comprising inserting the metering elements into the tube body.

13. The method of claim 10, further comprising drilling through the tube body in the area of each of the metering elements.

14. The method of claim 10, wherein the connecting step includes welding the metering elements to the walling.

* * * * *